United States Patent
He et al.

(10) Patent No.: US 9,296,875 B2
(45) Date of Patent: Mar. 29, 2016

(54) METHOD FOR PREPARING SPINNING SOLUTION OF ULTRA-HIGH MOLECULAR WEIGHT POLYETHYLENE FIBER

(75) Inventors: Peng He, Beijing (CN); Xingliang Huang, Beijing (CN)

(73) Assignee: BEIJING TONGYIZHONG SPECIALTY FIBRE TECHNOLOGY & DEVELOPMENT CO., LTD, Beijing (CN)

( * ) Notice: Subject to any disclaimer, the term of this patent is extended or adjusted under 35 U.S.C. 154(b) by 383 days.

(21) Appl. No.: 13/817,483

(22) PCT Filed: Aug. 22, 2011

(86) PCT No.: PCT/CN2011/078685
§ 371 (c)(1),
(2), (4) Date: Feb. 18, 2013

(87) PCT Pub. No.: WO2012/025034
PCT Pub. Date: Mar. 1, 2012

(65) Prior Publication Data
US 2013/0143987 A1   Jun. 6, 2013

(30) Foreign Application Priority Data

Aug. 24, 2010 (CN) .......................... 2010 1 0262244

(51) Int. Cl.
| | |
|---|---|
| C08K 5/11 | (2006.01) |
| C08K 5/42 | (2006.01) |
| C08K 5/372 | (2006.01) |
| C08J 3/09 | (2006.01) |
| D01D 1/02 | (2006.01) |
| D01F 6/04 | (2006.01) |

(52) U.S. Cl.
CPC ... *C08K 5/11* (2013.01); *C08J 3/09* (2013.01); *C08K 5/372* (2013.01); *C08K 5/42* (2013.01); *D01D 1/02* (2013.01); *D01F 6/04* (2013.01); *C08J 2323/06* (2013.01)

(58) Field of Classification Search
CPC ............ C08K 5/11; C08K 5/42; C08K 5/372; D01D 1/02; D01F 6/04
USPC .......................... 524/501, 161, 585, 388, 291
See application file for complete search history.

(56) References Cited

U.S. PATENT DOCUMENTS

| | | | |
|---|---|---|---|
| 3,743,272 A * | 7/1973 | Nowotny et al. ................. | 264/69 |
| 4,422,993 A | 12/1983 | Smith et al. | |
| 4,430,383 A | 2/1984 | Smith et al. | |
| 2010/0233480 A1 | 9/2010 | Hu et al. | |

FOREIGN PATENT DOCUMENTS

| | | |
|---|---|---|
| CN | 1190137 A | 8/1998 |
| CN | 1405367 A | 3/2003 |
| CN | 1631943 A | 6/2005 |
| CN | 101235551 A | 8/2008 |
| CN | 101525778 A | 9/2009 |
| CN | 101575743 A | 11/2009 |
| CN | 101956238 A | 1/2011 |
| EP | 0135253 A1 | 3/1985 |
| EP | 0 205 960 A2 | 12/1986 |
| EP | 0 255 618 A2 | 2/1988 |
| RU | 2121483 C1 | 11/1998 |
| WO | WO-2005066397 A1 | 7/2005 |
| WO | WO 2005066397 A1 * | 7/2005 |
| WO | WO-2008141406 A1 | 11/2008 |

OTHER PUBLICATIONS

Russian Federal Service for Intellectual Property Notice of Allowance dated Jul. 9, 2014 regarding their reference No. 2403-293074RU/63, Application No. 2013111847. Translation procided by Unitalen Attorneys At Law.
Extended European Search Report regarding Application No. 11819409.1-1303 / 2610374 PCT/CN2011078685, dated Jan. 31, 2014.
International Search Report (in Chinese with English translation) and Written Opinion (in Chinese) for PCT/CN2011/078685, mailed Dec. 1, 2011; ISA/CN.

* cited by examiner

*Primary Examiner* — Ling Choi
*Assistant Examiner* — Ronald Grinsted
(74) *Attorney, Agent, or Firm* — Harness, Dickey & Pierce, P.L.C.

(57) ABSTRACT

Provided is a method for preparing a spinning solution of ultra-high molecular weight polyethylene fiber, which comprises mixing a dissolved solution of ultra-high molecular weight polyethylene with a swollen solution of ultra-high molecular weight polyethylene at a weight ratio of 0.42~2.85, to obtain a spinning solution with a content of the ultra-high molecular weight polyethylene being 10%~15% by weight; the content of the ultra-high molecular weight polyethylene in the swollen solution of ultra-high molecular weight polyethylene is 10%~50% by weight; and the weight ratio of the ultra-high molecular weight polyethylene in the swollen solution of ultra-high molecular weight polyethylene to the ultra-high molecular weight polyethylene in the dissolved solution of ultra-high molecular weight polyethylene is 2.5~70. Since the dissolved solution functions to plasticize the swollen solution, the problem of high viscosity of the spinning solution is well addressed, thus ensuring that the spinning solution has a good fluidity and spinning continuity, and avoiding broken filament and filament breakage from occurring in the subsequent spinning process, so as to prepare ultra-high molecular weight polyethylene fiber with good performance.

8 Claims, No Drawings

METHOD FOR PREPARING SPINNING SOLUTION OF ULTRA-HIGH MOLECULAR WEIGHT POLYETHYLENE FIBER

CROSS-REFERENCE TO RELATED APPLICATIONS

The present application is a Section 371 National Stage Application of International Application No. PCT/CN2011/078685, filed on Aug. 22, 2011, and claims the priority of Chinese Patent Application No. 201010262244.9, entitled "Method for Preparing Spinning Solution of Ultra-high Molecular Weight Polyethylene Fiber", filed on Aug. 24, 2010, the disclosures of which are incorporated by reference herein in their entirety.

FIELD OF THE INVENTION

The present invention relates to a method for preparing ultra-high molecular weight polyethylene fiber, and in particular, to a method for preparing a spinning solution of ultra-high molecular weight polyethylene fiber.

BACKGROUND OF THE INVENTION

Ultra-high molecular weight polyethylene fiber (UHM-WPE), also known as high-strength and high-modulus polyethylene fiber, refers to the high performance fiber produced from polyethylene having a relative molecular weight of $1\times10^6$ or higher through sequential processes of spinning, extracting, drying and ultra-drawing. A fiber reinforced composites produced by using ultra-high molecular weight polyethylene fiber have the advantages of light weight, good impact resistance, high dielectric property and the like, and are widely used in the fields of aeronautic and astronautic industries, the defense in sea areas, weapon facilities and ordinary industries.

In the prior art, the gel spinning technology, a technology firstly invented by DSM Corp., Holland, are generally adopted in the preparation of ultra-high molecular weight polyethylene fiber. In this technology, polyethylene with relative molecular weight of $1\times10^6$ or higher is usually used as raw material, the suspension obtained by mixing and swelling the material in suitable solvent is used as spinning solution, then the spinning solution is sheared, homogenized and disentangled by screw extruder and then extruded through spinneret assembly to obtain the as-spun gel filament, after the subsequent extracting, drying and ultra-drawing of the as-spun gel filament, ultra-high molecular weight polyethylene fiber is obtained.

To ensure that the as-spun gel filament possesses sound drawing capacity so as to achieve superior mechanical behavior, it is necessary that there exist a certain number of entanglement points in the gel filament, that is, it is necessary to increase the density of the chain entanglement points in the as-spun gel filament. Because the macromolecular entanglement density of ultra-high molecular weight polyethylene fiber is closely correlated with the concentration of the spinning solution (solid content) and the molecular weight of the raw material, it is possible to increase the chain entanglement density in the gel filament by increasing, at the time of spinning solution preparation, the molecular weight of the raw material or the density of the spinning solution. However, in practice, the only increase of the molecular weight or the solid content in the spinning solution will bring negative effect. For example, when the molecular weight is too high, the polymer particles will be difficult to dissolve thoroughly during the dissolution process and the phenomenon of caking may occur, causing the spinning solution nonhomogeneous and in turn influencing the performance of the filament. Furthermore, the nonhomogeneity of the spinning solution will also influence the increase of the density of the spinning solution.

In the prior art, in order to prepare homogenous spinning solution, some people resort to stepwise swelling of the ultra-high molecular weight polyethylene, that is, realizing pre-swelling and swelling sequentially by stepwise mixing the ultra-high molecular weight polyethylene in multiple swelling kettles and finally putting them into a dissolving kettle with temperature close to the dissolving temperature of the ultra-high molecular weight polyethylene so that the ultra-high molecular weight polyethylene dissolves and the spinning solution forms. However, when the ultra-high molecular weight polyethylene dissolves, the viscosity of the spinning solution tends to increase dramatically, and the weissenberg effect (or known as "rod climbing effect") tends to occur, thus influencing the smooth proceeding of the subsequent spinning.

In addition to the above stepwise swelling process, in U.S. Pat. No. 4,422,993 and U.S. Pat. No. 4,430,383, Pole. Smith, Pieta Yang Lemstra etc. utilize two types of polyethylene having a molecular weight of $1.5\times10^5$ and $4\times10^6$ respectively to prepare the spinning solution, in which case, the solid content can only reach 5%. Although the problem of nonhomogeneity is resolved, the problem of low spinning efficiency emerges. In Patent No CN101525778A, Xin Zhirong etc. start from the polyethylene with molecular weight of $2\sim5\times10^6$ and make use of screw to realize one-step swelling and dissolving, and the solid content can reach 10~15%. This method shows certain effect in resolving the problem of non-homogeneity, but there are higher demands to the process and equipment and the operating procedure is complicated.

SUMMARY OF THE INVENTION

The problem to be resolved in the present invention is to provide a method for preparing a spinning solution of ultra-high molecular weight polyethylene fiber. The spinning solution of ultra-high molecular weight polyethylene fiber prepared According to the present invention has high solid content; and the ultra-high molecular weight polyethylene fiber prepared from this spinning solution is stable in performance and has high strength.

To resolve the above-mentioned technical problem, the invention provides a method for preparing a spinning solution of ultra-high molecular weight polyethylene fiber, comprising the steps of:

mixing a dissolved solution of ultra-high molecular weight polyethylene with a swollen solution of ultra-high molecular weight polyethylene at a weight ratio of 0.42~2.85, to obtain a spinning solution in which the content of the ultra-high molecular weight polyethylene is 10%~15% by weight;

the content of the ultra-high molecular weight polyethylene in the swollen solution of ultra-high molecular weight polyethylene is 10~50% by weight; and the weight ratio of the ultra-high molecular weight polyethylene in the swollen solution of ultra-high molecular weight polyethylene to the ultra-high molecular weight polyethylene in the dissolved solution of ultra-high molecular weight polyethylene is 2.5~70.

Preferably, the weight ratio of the dissolved solution of ultra-high molecular weight polyethylene to the swollen solution of ultra-high molecular weight polyethylene is 1.0~2.5.

Preferably, the content of the ultra-high molecular weight polyethylene in the swollen solution of ultra-high molecular weight polyethylene is 20~30% by weight.

Preferably, the weight ratio of the ultra-high molecular weight polyethylene in the swollen solution of ultra-high molecular weight polyethylene to that in the dissolved solution of ultra-high molecular weight polyethylene is 10~30.

Preferably, the content of the ultra-high molecular weight polyethylene in the spinning solution of ultra-high molecular weight polyethylene fiber is 11%~14% by weight.

Preferably, the content of the ultra-high molecular weight polyethylene in the spinning solution of ultra-high molecular weight polyethylene fiber is 12%~13% by weight.

Preferably, the weight average molecular weight of the ultra-high molecular weight polyethylene in the spinning solution of ultra-high molecular weight polyethylene fiber is $3 \times 10^6 \sim 5 \times 10^6$.

Preferably, the solvent in the spinning solution of ultra-high molecular weight polyethylene fiber is a mixed solvent obtained by mixing cyclane and alkane in a proportion of 85~90:10~15, wherein the cyclane has 25~50 carbon atoms and the alkane has 25~50 carbon atom.

Preferably, the swollen solution of ultra-high molecular weight polyethylene is prepared as follows:

a powder of ultra-high molecular weight polyethylene is added to a first portion of a solvent under stirring;

a second portion of the solvent and a first emulsified solvent are added to the first portion of the solvent to obtain a first mixture;

the temperature of the first mixture is raised to 90° C.~130° C. and held at the temperature for swelling to obtain a swollen solution of ultra-high molecular weight polyethylene;

the first emulsified solvent is formed from a third portion of the solvent, an antioxidant and a surfactant through emulsification;

the weight ratio of the first portion of the solvent:the second portion of the solvent:the third portion of the solvent:the antioxidant:the surfactant is 45~55:45~55:1~20:0.5~5:0.05~0.1.

Preferably, the dissolved solution of ultra-high molecular weight polyethylene is prepared by the steps of:

a second emulsified solvent, a third emulsified solvent, a fourth emulsified solvent and a fifth portion of the solvent are added to a fourth portion of the solvent under stirring to obtain a second mixture, which is heated to a temperature of 100° C.~190° C. under stirring to obtain a dissolved solution of ultra-high molecular weight polyethylene;

the second emulsified solvent is formed from a sixth portion of the solvent and the ultra-high molecular weight polyethylene in a proportion of 1~5:0.4~0.6 through emulsification;

the fourth emulsified solvent is formed from a seventh portion of the solvent and an antioxidant through emulsification;

the weight ratio of the fourth portion of the solvent:the fifth portion of the solvent:the sixth portion of the solvent:the seventh portion of the solvent is 67~75:15~25:2~10:2~4.

In the present invention, a high solid content spinning solution having 10~15% by weight of ultra-high molecular weight polyethylene is obtained by adding a dissolved solution to a swollen solution, and mixing under stirring. Since the dissolved solution can function to plasticize the swollen solution, the viscosity of the spinning solution system can be lowered, ensuring that the spinning solution has better fluidity and spinning continuity, so as to avoid broken filament and filament breakage from occurring in subsequent spinning processes. Furthermore, the addition of a dissolved solution to a swollen solution may allow the gel filament of ultra-high molecular weight polyethylene produced during the gel spinning process to contain appropriate amount of chain entanglement points, so as to ensure that the filaments can smoothly transfer the tensile force in the filaments during subsequent drawing process to realize the purpose of ultra-drawing, thereby preventing filament breakage from occurring and ensuring consistent performance in the ultra-high molecular weight polyethylene fiber.

DETAILED DESCRIPTION OF THE INVENTION

For better understanding of the invention, reference is made to the following detailed description of the preferred embodiments of the invention, but it should be understood that the description is made only for further explaining the features and advantages of the invention and is not intended to limit the scope of the invention in any way.

This invention provides a method for preparing a spinning solution of ultra-high molecular weight polyethylene fiber, which comprises the steps of:

Mixing a dissolved solution of ultra-high molecular weight polyethylene with a swollen solution of ultra-high molecular weight polyethylene at a weight ratio of 0.42~2.85, to obtain a spinning solution in which the content of the ultra-high molecular weight polyethylene is 10%~15%;

The content of the ultra-high molecular weight polyethylene in the swollen solution of ultra-high molecular weight polyethylene is 10~50% by weight;

The weight ratio of the ultra-high molecular weight polyethylene in the swollen solution of ultra-high molecular weight polyethylene to the ultra-high molecular weight polyethylene in the dissolved solution of ultra-high molecular weight polyethylene is 2.5~70.

According to the present invention, the swollen solution of ultra-high molecular weight polyethylene is intended to, as well known to those skilled in the art, mean the suspension obtained after the swelling of the ultra-high molecular weight polyethylene macromolecules by the small solvent molecules penetrated and diffused into between the macromolecules of ultra-high molecular weight polyethylene after mixing the ultra-high molecular weight polyethylene with a solvent; the dissolved solution of ultra-high molecular weight polyethylene is intended to, as well known to those skilled in the art, mean the solution obtained by dissolving the ultra-high molecular weight polyethylene in a solvent.

According to the present invention, the content of the ultra-high molecular weight polyethylene in the spinning solution of ultra-high molecular weight polyethylene fiber is preferably 11~14% by weight, more preferably 12~13% by weight. The content of the ultra-high molecular weight polyethylene in the swollen solution of ultra-high molecular weight polyethylene is preferably 11~49% by weight, more preferably 15~40% by weight, and most preferably 20~30% by weight. The content of the ultra-high molecular weight polyethylene in the dissolved solution of ultra-high molecular weight polyethylene is preferably 0.2~2% by weight, more preferably 0.3~1.5% by weight, and even more preferably 0.8~1.2% by weight.

According to the present invention, when preparing a spinning solution by mixing the swollen solution of ultra-high molecular weight polyethylene with the dissolved solution of ultra-high molecular weight polyethylene under stirring, the weight ratio of the dissolved solution of ultra-high molecular weight polyethylene to the swollen solution of ultra-high molecular weight polyethylene is preferably 0.42~2.85, more preferably 1.0~2.5, even more preferably 1.4~1.8. The weight ratio of the ultra-high molecular weight polyethylene in the swollen solution to that in the dissolved solution is preferably 2.5~70, more preferably 5~50, even more preferably 10~30. The stirring period is preferably 20 min~120 min, more preferably 45 min~100 min, most preferably 60 min~80 min.

When preparing a spinning solution by mixing the swollen solution of ultra-high molecular weight polyethylene with the dissolved solution of ultra-high molecular weight polyethylene under stirring, it is preferred to adopt the following steps:

Firstly, the swollen solution of ultra-high molecular weight polyethylene is stirred in a mixing kettle at normal temperature and normal pressure, then the swollen solution is heated to a temperature higher than the temperature at which phase separation of the swollen solution occurs, preferably 8~15° C. higher than the phase separation temperature, more preferably 10° C. higher than the phase separation temperature. The phase transition temperature of ultra-high molecular weight polyethylene is generally acknowledged to those skilled in the art, and is approximately between 70° C. and 90° C. depending upon the molecular weight. In the present invention, after the swollen solution is heated to 65~85° C., the dissolved solution of ultra-high molecular weight polyethylene is added to the swollen solution, stirred and mixed to provide the spinning solution.

During the above process of preparing mixed swollen solution and dissolved solution, the aim of heating the swollen solution to a temperature higher than the phase separation temperature is to reduce the viscosity and increase the fluidity of the swollen solution. Then, during the above stirring process, the dissolved solution functions to plasticize the swollen solution, thus appreciably addressing the problem of high viscosity of the spinning solution system, ensuring that the spinning solution has a good fluidity and spinning continuity, so as to avoid broken filament and filament breakage from occurring in subsequent spinning processes. Furthermore, the addition of a dissolved solution to a swollen solution may allow the gel filament of ultra-high molecular weight polyethylene produced during the gel spinning process to have appropriate amount of entanglements, so as to ensure the smooth transfer of the tensile force in the filaments during subsequent drawing process for realizing the purpose of ultra-drawing and preventing filament breakage from occurring.

According to the present invention, when preparing the swollen solution of ultra-high molecular weight polyethylene, it is preferred to adopt the following steps:

the powder of ultra-high molecular weight polyethylene is added to a first portion of the solvent under stirring;

a second portion of the solvent and a first emulsified solvent are added to the first portion of solvent to obtain a first mixture;

the first mixture is heated to 90° C.~130° C. and held for swelling to obtain the swollen solution of ultra-high molecular weight polyethylene;

the first emulsified solvent is formed from a third portion of the solvent, an antioxidant and a surfactant through emulsification;

The weight ratio of the first portion of the solvent:the second portion of the solvent:the third portion of the solvent:the antioxidant:the surfactant is 45~55:45~55:1~20:0.5~5:0.05~0.1, preferably 45~55:45~55:2~10:1~3:0.05~0.1, more preferably 50:50:4~8:1.5~2.5:0.05~0.1.

According to the present invention, the first portion of the emulsified solvent is preferably prepared according to the following process: the antioxidant and the surfactant are added to the third portion of the solvent, and emulsified by stirring. The stirring speed is preferably 2500 rpm (revolutions per minute)~3500 rpm, more preferably 2750 rpm~3250 rpm. The stirring period is preferably 20 min~100 min, more preferably 30 min~80 min, and even more preferably 40 min~100 min.

According to the present invention, when the first mixture is held for swelling, the holding period can be adjusted according to the degree of swelling, preferably to allow the degree of swelling of the ultra-high molecular weight polyethylene to reach 1~2, more preferably 1.1~1.8, even more preferably 1.2~1.6, followed by stopping holding. The holding period is preferably 30~100 min, more preferably 40~90 min, even more preferably 50~80 min. The degree of swelling η used herein can be calculated according to equation I:

$$\eta = W_1/W_2 \qquad \text{Equation I}$$

Where, $W_1$ is defined as the weight of a portion of the swollen solution of ultra-high molecular weight polyethylene after 20 min of vacuum filtration; $W_2$ is defined as the weight of the vacuum filtered swollen material of weight $W_1$ after being extracted with decalin for three times and then being dried at 90° C. till constant weight.

According to the present invention, when preparing the dissolved solution of ultra-high molecular weight polyethylene, it is preferred to adopt the following steps:

a second emulsified solvent, a third emulsified solvent and a fifth portion of solvent are added to a fourth portion of solvent, and stirred well to obtain a second mixture, wherein the stirring speed is preferably 2500 rpm~3500 rpm, more preferably 3000 rpm; and then the second mixture is heated to 100° C.~190° C. under stirring to obtain the dissolved solution of ultra-high molecular weight polyethylene.

the second emulsified solvent is formed from a sixth portion of solvent and the ultra-high molecular weight polyethylene in a proportion of 1~5:0.4~0.6 through emulsification;

the fourth emulsified solvent is formed from a seventh portion of solvent and an antioxidant through emulsification, wherein the seventh portion of solvent comprises preferably 2%~4% of the total weight of the solvent in the dissolved solution of ultra-high molecular weight polyethylene; the antioxidant comprises preferably 1%~8%, more preferably 2%~7%, even more preferably 4%~6% of the total weight of the ultra-high molecular weight polyethylene in the dissolved solution of ultra-high molecular weight polyethylene.

According to the present invention, during the preparation of the dissolved solution of ultra-high molecular weight polyethylene, the weight ratio of the fourth portion of solvent:the fifth portion of solvent:the sixth portion of solvent:the seventh portion of solvent is 67~75:15~25:2~10:2~4, more preferably 67~75:15~25:3~8:2~4, even more preferably 67~75:20:4~6:3.

According to the present invention, when preparing the second emulsified solution, it can be done by dividing the sixth portion of solvent and the ultra-high molecular weight polyethylene into two equal portions and carrying out emulsification separately; the emulsifying period is preferably 10 min~60 min, more preferably 20 min~50 min, and even more preferably 30 min~40 min.

Heating the second mixture to 100° C.~190° C. under stirring to obtain the dissolved solution of ultra-high molecular weight polyethylene is preferred to follow the following steps: firstly, the second mixture is heated to 100° C.~150° C., more preferably 120° C.~140° C. and stirred at low speed of preferably 17 rpm~25 rpm, more preferably 18 rpm~20 rpm till the temperature of the second mixture reaches preferably 140° C.~190° C., more preferably 150° C.~180° C.; then the stirring speed is increased to 35 rpm~45 rpm, more preferably 38 rpm~42 rpm; and the mixture is held at the temperature to obtain the dissolved solution of ultra-high molecular weight polyethylene. The holding period is preferably 30 min~100 min, more preferably 40 min~80 min.

During the preparation of the dissolved solution of ultra-high molecular weight polyethylene, the purpose of firstly heating the second mixture and carrying out low-speed stirring is to allow the raw material particles of the ultra-high molecular weight polyethylene to completely swell during the heating and low-speed stirring and a majority of which begins to dissolve; by this time, the chain entanglements between the polymer macromolecules have been eliminated essentially. The purpose of stirring at low speed till the temperature of the second mixture reaches 140° C.~190° C., preferably reaches 150° C.~180° C. and then stirring at high speed is to facilitate the dissolution of the ultra-high molecular weight polyethylene.

According to the present invention, the solvent used herein is preferably the mixture obtained by mixing cyclane and alkane isomers in a proportion of 85~90:10~15, wherein the number of carbon atoms of the cyclane and alkane is preferably 25~50, more preferably 30~40. The solvent can be any solvent used in the spinning solution of ultra-high molecular weight polyethylene as is well known to those skilled in the art, for example, the white oil that preferably has no volatiles below 400° C., with initial boiling point preferably higher than 450° C., density preferably between 0.84~0.87 g/cm³ and flash point preferably higher than 260° C. can be used. The white oil used According to the present invention can be the No. 5 white oil, the No. 7 white oil, the No. 10 white oil, the No. 15 white oil, the No. 22 white oil, the No. 26 white oil, the No. 32 white oil, the No. 46 white oil, the No. 68 white oil, the No. 100 white oil and the No. 150 white oil well known to those skilled in the art. The antioxidant in the present invention can be the hindered phenol antioxidant and the aromatic amine antioxidant well known to those skilled in the art; the specific examples thereof can include, but not limited to, 2,6-tert-butyl-4-methylphenol, bis-(3,5-tert-butyl-4-hydroxyphenyl) thioether and pentaerythritol tetra-[β-(3,5-tert-butyl-4-hydroxyphenyl)-propionate]. The surfactant in the present invention can be the anionic, cationic and nonionic surfactants well known to those skilled in the art; the specific example can include, but not limited to, stearic acid, sodium dodecyl benzene sulfonate, quaternary ammonium salts, fatty acid glycerides, sorbitan fatty acid esters (Spans), polysorbates (Tweens) and the like.

The ultra-high molecular weight polyethylene used in the present invention preferably has a weight average molecular weight of 3~5×10⁶, more preferably 3.5~4.5×10⁶, and the degree of nonlinearity of the ultra-high molecular weight polyethylene is <5%. In the present invention, the powder of the ultra-high molecular weight polyethylene with a Gaussian distribution of the particle size is preferably used, and the particle size of the powders is preferably between 60 and 200 meshes.

According to the present invention, the prepared spinning solution of ultra-high molecular weight polyethylene fiber can be used to prepare ultra-high molecular weight polyethylene fiber according to the gel spinning technology well known to those skilled in the art. A specific example can be as follows: .the spinning solution is fed into a twin screw extruder for disentanglement, here, the inlet temperature of the extruder is preferably 85° C.~120° C., the temperature in the middle region is 240° C.~280° C., and the outlet temperature is 280° C.~320° C. The residence time of the suspension in the twin screw extruder is no more than 10 min, preferably, the residence time is 3~8 min, more preferably, the residence time is 4~6 min. The rotation speed of the twin screw extruder is 70 r/min~260 r/min, preferably, the rotation speed of the twin screw extruder is 150 r/min~230 r/min. The process conditions of gel spinning are preferably as follows: the pore diameter of the spinneret orifice is 0.6 mm~5 mm, the length-diameter ratio L/D of the spinneret orifice is 6/1~30/1, the extrusion speed of the spinning solution is 0.5 m/min~10 m/min; after extrusion, with cooling at 0° C.~36° C., gel filament is obtained.

Then, the gel filament is passed through extraction, and the extraction agent is preferably selected from hexane, heptane, toluene, chloromethane, solvent naphtha, and kerosene, with kerosene being more preferred. Then, the filament after extraction is dried at a temperature of preferably 40° C.~80° C., thereafter, the dried filament is subjected to a thermal drawing of 30 times~130 times, preferably 40 times~60 times at 70° C.~160° C. to form the ultra-high molecular weight polyethylene fiber.

In the present invention, the mechanical behavior of the fiber is tested according to the following method: using DXLL-20000 electronic tensile machine to measure the strength and the modulus of the fiber, with clamp distance of 250 mm and fall velocity of 50 mm/min.

The performance value of each specimen: recorded as $X_1, X_2, \ldots, X_n$, total of n specimens are tested;

The performance of a sample is taken as the arithmetic mean of the performance values of n specimens, that is:

$$X = \frac{\sum_{i=1}^{n} X_i}{n} \quad \text{Equation II}$$

Where, $X_i$ is the performance value of the ith specimen; n is the number of specimens.

Standard deviation (S) is calculated according to the following equation:

$$S = \sqrt{\frac{\sum_{i=1}^{n} (X - X_i)^2}{n-1}} \quad \text{Equation III}$$

Where, S is the standard deviation, and the other characters are as defined in Equation II;

Coefficient of variability (CV) is calculated according to the following equation:

$$CV = \frac{S}{X} \times 100\% \quad \text{Equation IV}$$

Where, CV is the coefficient of variability, and the other characters are as defined in Equation II.

For a better understanding of the invention, reference is made to the following detailed description of the preferred embodiments of the invention, but it should be appreciated that the description is only for further explaining the features and advantages of the invention while in no way to limit the scope of the invention.

For a better comparison of the results, the same raw materials are used in the following examples and comparative examples. The ultra-high molecular weight polyethylene used has a weight average molecular weight $M_W$ of $4.2 \times 10^6$ and a particle size of 80 μm~120 μm. The solvent used is the No. 120 white oil.

Example 1

(1) The Preparation of the Swollen Solution of Ultra-High Molecular Weight Polyethylene To a swelling kettle, 50 weight parts of a first portion of white oil was charged and stirred at 20 rpm, then 30 weight parts of powdery ultra-high molecular weight polyethylene was sprayed in evenly under stirring;

To 4 weight parts of a third portion of white oil, 1.5 weight parts of 2,6-tert-butyl-4-methylphenol (antioxidant) and 0.06 weight parts of sodium dodecyl benzene sulfonate (surfactant) were added and stirred for emulsification to obtain the first emulsified solvent, wherein the stirring speed was 3000 rpm, and the emulsifying period was 40 min;

To the swelling kettle, the first emulsified solvent and 50 weight parts of a second portion of white oil were added, the resultant mixture was heated to 105° C. under stirring and held for 50 min, then a swollen solution of ultra-high molecular weight polyethylene with degree of swelling of 1.23 was obtained, in which, the weight ratio of ultra-high molecular weight polyethylene was 22%.

In this swollen solution, the weight ratio between the first portion of white oil, the second portion of white oil and the third portion of white oil was 52:48:4.

(2) The Preparation of the Dissolved Solution of Ultra-High Molecular Weight Polyethylene 4 weight parts of a sixth portion of white oil and 1.1 weight parts of powdery ultra-high molecular weight polyethylene were evenly divided into two portions to carry out emulsification separately, thus the second emulsified solvent was obtained, wherein the emulsifying period was 30 min, and the stirring speed during the emulsification was 3000 rpm;

To 3 weight parts of a seventh portion of white oil, 0.04 weight parts of 2,6-tert-butyl-4-methylphenol (antioxidant) was added and stirred for emulsification to obtain the fourth emulsified solvent, wherein the stirring speed during the emulsification was 3000 rpm, and the emulsifying period was 40 min;

To a dissolving kettle, 67 weight parts of a fourth portion of white oil was charged and stirred at 40 rpm, then, the second emulsified solvent, the third emulsified solvent, the fourth emulsified solvent and 20 weight parts of a fifth portion of white oil were added and mixed, the mixture was heated to 130° C. and stirred at 19 rpm, then when the temperature of the material reached 160° C., the stirring speed was increased to 40 rpm and the temperature was held for 50 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 67:20:4:3.

(3) The Preparation of the Spinning Solution of Ultra-High Molecular Weight Polyethylene The swollen solution prepared in step (1) was stirred in swelling kettle under room temperature, then the swollen solution was heated to 90° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.1, the weight ratio of the ultra-high molecular weight polyethylene in the swollen solution to that in the dissolved solution was 17.2, and the content of the ultra-high molecular weight polyethylene in the spinning solution finally obtained was 11.1 wt %.

Example 2

(1) The Preparation of the Swollen Solution of Ultra-High Molecular Weight Polyethylene To a swelling kettle, 52 weight parts of a first portion of white oil was charged and stirred at 25 rpm, then 30 weight parts of powdery ultra-high molecular weight polyethylene was sprayed in evenly under stirring;

To 4 weight parts of a third portion of white oil, 1.4 weight parts of bis-(3,5-tert-butyl-4-hydroxyphenyl) thioether (antioxidant) and 0.07 weight parts of Span 80 (surfactant) were added and stirred for emulsification to obtain the first emulsified solvent, wherein the stirring speed was 3000 rpm, and the emulsifying period was 35 min;

To the swelling kettle, the first emulsified solvent and 48 weight parts of a second portion of white oil were added, the resultant mixture was heated to 110° C. under stirring and held for 50 min, then a swollen solution of ultra-high molecular weight polyethylene with degree of swelling of 1.31 was obtained, in which, the weight ratio of ultra-high molecular weight polyethylene was 22%.

In this swollen solution, the weight ratio between the first portion of white oil, the second portion of white oil and the third portion of white oil was 50:50:4.

(2) The Preparation of the Dissolved Solution of Ultra-High Molecular Weight Polyethylene 4 weight parts of a sixth portion of white oil and 1.1 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3.2 weight parts of a seventh portion of white oil, 0.04 weight parts of 2,6-tert-butyl-4-methylphenol (antioxidant) was added and stirred for emulsification to obtain the fourth emulsified solvent, wherein the stirring speed during the emulsification was 3000 rpm, and the emulsifying period was 30 min;

To a dissolving kettle, 67 weight parts of a fourth portion of white oil was charged and stirred at 40 rpm, then, the second emulsified solvent, the third emulsified solvent, the fourth emulsified solvent and 20 weight parts of a fifth portion of white oil were added and mixed, the mixture was heated to 120° C. and stirred at 19 rpm, then when the temperature of the material reached 150° C., the stirring speed was increased to 40 rpm and the temperature was held for 50 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 67:20:4:3.2.

(3) The Preparation of the Spinning Solution of Ultra-High Molecular Weight Polyethylene The swollen solution prepared in step (1) was stirred in swelling kettle under room temperature, then the swollen solution was heated to 90° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.2, and the content of the ultra-high molecular weight polyethylene in the spinning solution obtained was 10.7 wt %.

Example 3

(1) The Preparation of the Swollen Solution of Ultra-High Molecular Weight Polyethylene To a swelling kettle, 51 weight parts of a first portion of white oil was charged and stirred at 26 rpm, then 22 weight parts of powdery ultra-high molecular weight polyethylene was sprayed in evenly under stirring;

To 8 weight parts of a third portion of white oil, 2.5 weight parts of pentaerythritol tetra-[β-(3,5-tert-butyl-4-hydroxyphenyl)-propionate] (antioxidant) and 0.1 weight parts of Span 80 (surfactant) were added and stirred for emulsification to obtain the first emulsified solvent, wherein the stirring speed was 2800 rpm, and the emulsifying period was 40 min;

To the swelling kettle, the first emulsified solvent and 49 weight parts of a second portion of white oil were added, the resultant mixture was heated to 115° C. under stirring and held for 80 min, then a swollen solution of ultra-high molecular weight polyethylene with degree of swelling of 1.62 was obtained, in which, the weight ratio of ultra-high molecular weight polyethylene was 16.5%.

In this swollen solution, the weight ratio between the first portion of white oil, the second portion of white oil and the third portion of white oil was 51:49:8.

(2) The Preparation of the Dissolved Solution of Ultra-High Molecular Weight Polyethylene 6 weight parts of a sixth portion of white oil and 1.2 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3.2 weight parts of a seventh portion of white oil, 0.04 weight parts of 2,6-tert-butyl-4-methylphenol (antioxidant) was added and stirred for emulsification to obtain the fourth emulsified solvent, wherein the stirring speed during the emulsification was 3000 rpm, and the emulsifying period was 30 min;

To a dissolving kettle, 67 weight parts of a fourth portion of white oil was charged and stirred at 40 rpm, then, the second emulsified solvent, the third emulsified solvent, the fourth emulsified solvent and 20 weight parts of a fifth portion of white oil were added and mixed, the mixture was heated to 130° C. and stirred at 19 rpm, then when the temperature of the material reached 180° C., the stirring speed was increased to 40 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 68:20:6:3.2.

(3) The Preparation of the Spinning Solution of Ultra-High Molecular Weight Polyethylene The swollen solution prepared in step (1) was stirred in swelling kettle under room temperature, then the swollen solution was heated to 89° C. and the dissolved solution prepared in step (2) was added, after stirring for 70 min, the spinning solution of ultra-high molecular weight polyethylene fiber was obtained, in which the weight ratio of the swollen solution to the dissolved solution was 1:0.56, and the content of the ultra-high molecular weight polyethylene in the spinning solution obtained was 11.2 wt %.

Example 4

(1) The Preparation of the Swollen Solution of Ultra-High Molecular Weight Polyethylene To a swelling kettle, 49 weight parts of a first portion of white oil was charged and stirred at 26 rpm, then 36 weight parts of powdery ultra-high molecular weight polyethylene was sprayed in evenly under stirring;

To 4 weight parts of a third portion of white oil, 1.5 weight parts of pentaerythritol tetra-[β-(3,5-tert-butyl-4-hydroxyphenyl)-propionate] (antioxidant) and 0.06 weight parts of Span 80 (surfactant) were added and stirred for emulsification to obtain the first emulsified solvent, wherein the stirring speed was 3200 rpm, and the emulsifying period was 60 min;

To the swelling kettle, the first emulsified solvent and 51 weight parts of a second portion of white oil were added, the resultant mixture was heated to 120° C. under stirring and held for 75 min, then a swollen solution of ultra-high molecular weight polyethylene with degree of swelling of 1.51 was obtained, in which, the weight ratio of ultra-high molecular weight polyethylene was 25.4%.

In this swollen solution, the weight ratio between the first portion of white oil, the second portion of white oil and the third portion of white oil was 49:51:4.

(2) The Preparation of the Dissolved Solution of Ultra-High Molecular Weight Polyethylene 6 weight parts of a sixth portion of white oil and 1.2 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3 weight parts of a seventh portion of white oil, 0.04 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 40 min;

To a dissolving kettle, 67 weight parts of a fourth portion of white oil was charged and stirred at 40 rpm, then, the second emulsified solvent, the third emulsified solvent, the fourth emulsified solvent and 20 weight parts of a fifth portion of white oil were added and mixed, the mixture was heated to 140° C. and stirred at 20 rpm, then when the temperature of the material reached 170° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 67:20:4:3.

(3) The Preparation of the Spinning Solution of Ultra-High Molecular Weight Polyethylene The swollen solution prepared in step (1) was stirred in swelling kettle under room temperature, then the swollen solution was heated to 90° C. and the dissolved solution prepared in step (2) was added, after stirring for 60 min, the spinning solution of ultra-high molecular weight polyethylene fiber was obtained, in which the weight ratio of the swollen solution to the dissolved solution was 1:1.62, and the content of the ultra-high molecular weight polyethylene in the spinning solution obtained was 10.5 wt %.

Example 5

(1) The Preparation of the Swollen Solution of Ultra-High Molecular Weight Polyethylene To a swelling kettle, 55 weight parts of a first portion of white oil was charged and stirred at 26 rpm, then 45 weight parts of powdery ultra-high molecular weight polyethylene was sprayed in evenly under stirring;

To 5 weight parts of a third portion of white oil, 2.5 weight parts of pentaerythritol tetra-[β-(3,5-tert-butyl-4-hydroxyphenyl)-propionate] (antioxidant) and 0.06 weight parts of Span 80 (surfactant) were added and stirred for emulsification to obtain the first emulsified solvent, wherein the stirring speed was 3200 rpm, and the emulsifying period was 40 min;

To the swelling kettle, the first emulsified solvent and 45 weight parts of a second portion of white oil were added, the resultant mixture was heated to 105° C. under stirring and held for 65 min, then a swollen solution of ultra-high molecular weight polyethylene with degree of swelling of 1.26 was obtained, in which, the weight ratio of ultra-high molecular weight polyethylene was 22.9%.

In this swollen solution, the weight ratio between the first portion of white oil, the second portion of white oil and the third portion of white oil was 55:45:5.

(2) The Preparation of the Dissolved Solution of Ultra-High Molecular Weight Polyethylene 4 weight parts of a sixth portion of white oil and 1.2 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3 weight parts of an eighth portion of white oil, 0.04 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 50 min;

To a dissolving kettle, 70 weight parts of a fourth portion of white oil was charged and stirred at 40 rpm, then, the second emulsified solvent, the third emulsified solvent, the fourth emulsified solvent and 20 weight parts of a fifth portion of white oil were added and mixed, the mixture was heated to 120° C. and stirred at 20 rpm, then when the temperature of the material reached 150° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 70:20:5:3.

(3) The Preparation of the Spinning Solution of Ultra-High Molecular Weight Polyethylene The swollen solution prepared in step (1) was stirred in swelling kettle under room temperature, then the swollen solution was heated to 91° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.9, and the content of the ultra-high molecular weight polyethylene in the spinning solution obtained was 11 wt %.

Example 6

(1) The Preparation of the Swollen Solution of Ultra-High Molecular Weight Polyethylene To a swelling kettle, 45 weight parts of a first portion of white oil was charged and stirred at 26 rpm, then 40 weight parts of powdery ultra-high molecular weight polyethylene was sprayed in evenly under stirring;

To 10 weight parts of a third portion of white oil, 1.7 weight parts of pentaerythritol tetra-[β-(3,5-tert-butyl-4-hydroxyphenyl)-propionate] (antioxidant) and 0.07 weight parts of Span 80 (surfactant) were added and stirred for emulsification to obtain the first emulsified solvent, wherein the stirring speed was 3200 rpm, and the emulsifying period was 35 min;

To the swelling kettle, the first emulsified solvent and 55 weight parts of a second portion of white oil were added, the resultant mixture was heated to 105° C. under stirring and held for 65 min, then a swollen solution of ultra-high molecular weight polyethylene with degree of swelling of 1.38 was obtained, in which, the weight ratio of ultra-high molecular weight polyethylene was 18.2%.

In this swollen solution, the weight ratio between the first portion of white oil, the second portion of white oil and the third portion of white oil was 45:55:10.

(2) The Preparation of the Dissolved Solution of Ultra-High Molecular Weight Polyethylene 7 weight parts of a sixth portion of white oil and 1.05 weight parts of powdery ultra-high molecular weight polyethylene were emulsified to obtain the second emulsified solvent, wherein the emulsifying period was 35 min, and the stirring speed during the emulsification was 3000 rpm;

To 2.5 weight parts of an eighth portion of white oil, 0.03 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 50 min;

To a dissolving kettle, 69 weight parts of a fourth portion of white oil was charged and stirred at 40 rpm, then, the second emulsified solvent, the third emulsified solvent, the fourth emulsified solvent and 18 weight parts of a fifth portion of white oil were added and mixed, the mixture was heated to 125° C. and stirred at 20 rpm, then when the temperature of the material reached 165° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 69:18:7:2.5.

(3) The Preparation of the Spinning Solution of Ultra-High Molecular Weight Polyethylene The swollen solution prepared in step (1) was stirred in swelling kettle under room temperature, then the swollen solution was heated to 90° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.2, and the content of the ultra-high molecular weight polyethylene in the spinning solution obtained was 12.6 wt %.

Example 7

(1) The Preparation of the Swollen Solution of Ultra-High Molecular Weight Polyethylene To a swelling kettle, 48 weight parts of a first portion of white oil was charged and stirred at 26 rpm, then 35 weight parts of powdery ultra-high molecular weight polyethylene was sprayed in evenly under stirring;

To 6 weight parts of a third portion of white oil, 1.8 weight parts of pentaerythritol tetra-[β-(3,5-tert-butyl-4-hydroxyphenyl)-propionate] (antioxidant) and 0.07 weight parts of Span 80 (surfactant) were added and stirred for emulsification to obtain the first emulsified solvent, wherein the stirring speed was 3200 rpm, and the emulsifying period was 37 min;

To the swelling kettle, the first emulsified solvent and 52 weight parts of a second portion of white oil were added, the resultant mixture was heated to 100° C. under stirring and held for 65 min, then a swollen solution of ultra-high molecular weight polyethylene with degree of swelling of 1.43 was obtained, in which, the weight ratio of ultra-high molecular weight polyethylene was 24.5%.

In this swollen solution, the weight ratio between the first portion of white oil, the second portion of white oil and the third portion of white oil was 45:55:6.

(2) The Preparation of the Dissolved Solution of Ultra-High Molecular Weight Polyethylene 7 weight parts of a sixth portion of white oil and 1.13 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3.3 weight parts of a seventh portion of white oil, 0.05 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 45 min;

To a dissolving kettle, 70 weight parts of a fourth portion of white oil was charged and stirred at 40 rpm, then, the second emulsified solvent, the third emulsified solvent, the fourth emulsified solvent and 21 weight parts of a fifth portion of white oil were added and mixed, the mixture was heated to 135° C. and stirred at 20 rpm, then when the temperature of the material reached 171° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 71:21:7:3.3.

(3) The Preparation of the Spinning Solution of Ultra-High Molecular Weight Polyethylene The swollen solution prepared in step (1) was stirred in swelling kettle under room temperature, then the swollen solution was heated to 88° C. and the dissolved solution prepared in step (2) was added, after stirring for 60 min, the spinning solution of ultra-high molecular weight polyethylene fiber was obtained, in which the weight ratio of the swollen solution to the dissolved solution was 1:1.4, and the content of the ultra-high molecular weight polyethylene in the spinning solution obtained was 10.9 wt %.

Example 8

(1) The Preparation of the Swollen Solution of Ultra-High Molecular Weight Polyethylene To a swelling kettle, 55 weight parts of a first portion of white oil was charged and stirred at 26 rpm, then 40 weight parts of powdery ultra-high molecular weight polyethylene was sprayed in evenly under stirring;

To 7 weight parts of a third portion of white oil, 1.9 weight parts of pentaerythritol tetra-[β-(3,5-tert-butyl-4-hydroxyphenyl)-propionate] (antioxidant) and 0.05 weight parts of Span 80 (surfactant) were added and stirred for emulsification to obtain the first emulsified solvent, wherein the stirring speed was 3200 rpm, and the emulsifying period was 60 min;

To the swelling kettle, the first emulsified solvent and 46 weight parts of a second portion of white oil were added, the resultant mixture was heated to 120° C. under stirring and held for 65 min, then a swollen solution of ultra-high molecular weight polyethylene with degree of swelling of 1.53 was obtained, in which, the weight ratio of ultra-high molecular weight polyethylene was 26.6%.

In this swollen solution, the weight ratio between the first portion of white oil, the second portion of white oil and the third portion of white oil was 55:46:7.

(2) The Preparation of the Dissolved Solution of Ultra-High Molecular Weight Polyethylene 7 weight parts of a sixth portion of white oil and 1.13 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 3.5 weight parts of an eighth portion of white oil, 0.05 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 38 min;

To a dissolving kettle, 65 weight parts of a fourth portion of white oil was charged and stirred at 40 rpm, then, the second emulsified solvent, the third emulsified solvent, the fourth emulsified solvent and 22 weight parts of a fifth portion of white oil were added and mixed, the mixture was heated to 130° C. and stirred at 20 rpm, then when the temperature of the material reached 176° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 65:22:7:3.5.

(3) The Preparation of the Spinning Solution of Ultra-High Molecular Weight Polyethylene The swollen solution prepared in step (1) was stirred in swelling kettle under room temperature, then the swollen solution was heated to 92° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.6, and the content of the ultra-high molecular weight polyethylene in the spinning solution obtained was 10.9 wt %.

Example 9

(1) The Preparation of the Swollen Solution of Ultra-High Molecular Weight Polyethylene To a swelling kettle, 45 weight parts of a first portion of white oil was charged and stirred at 26 rpm, then 45 weight parts of powdery ultra-high molecular weight polyethylene was sprayed in evenly under stirring;

To 15 weight parts of a third portion of white oil, 3.5 weight parts of pentaerythritol tetra-[β-(3,5-tert-butyl-4-hydroxyphenyl)-propionate] (antioxidant) and 0.05 weight parts of Span 80 (surfactant) were added and stirred for emulsification to obtain the first emulsified solvent, wherein the stirring speed was 3200 rpm, and the emulsifying period was 60 min;

To the swelling kettle, the first emulsified solvent and 55 weight parts of a second portion of white oil were added, the resultant mixture was heated to 130° C. under stirring and held for 65 min, then a swollen solution of ultra-high molecular weight polyethylene with degree of swelling of 1.58 was obtained, in which, the weight ratio of ultra-high molecular weight polyethylene was 27.5%.

In this swollen solution, the weight ratio between the first portion of white oil, the second portion of white oil and the third portion of white oil was 45:55:15.

(2) The Preparation of the Dissolved Solution of Ultra-High Molecular Weight Polyethylene 7 weight parts of a sixth portion of white oil and 1.14 weight parts of powdery ultra-high molecular weight polyethylene were evenly divided into two portions to carry out emulsification separately, thus the second emulsified solvent was obtained, wherein the emulsifying period was 35 min, and the stirring speed during the emulsification was 3000 rpm;

To 4.5 weight parts of an eighth portion of white oil, 0.07 weight parts of pentaerythritol tetra-[β-(3,5-tert-butyl-4-hydroxyphenyl)-propionate] (antioxidant) was added and stirred for emulsification to obtain the fourth emulsified solvent, wherein the stirring speed during the emulsification was 3000 rpm, and the emulsifying period was 40 min;

To a dissolving kettle, 68 weight parts of a fourth portion of white oil was charged and stirred at 40 rpm, then, the second emulsified solvent, the third emulsified solvent, the fourth emulsified solvent and 22 weight parts of a fifth portion of white oil were added and mixed, the mixture was heated to 132° C. and stirred at 20 rpm, then when the temperature of the material reached 155° C., the stirring speed was increased to 42 rpm and the temperature was held for 40 min, then a dissolved solution of ultra-high molecular weight polyethylene was obtained;

In this dissolved solution, the weight ratio between the fourth portion of white oil, the fifth portion of white oil, the sixth portion of white oil and the seventh portion of white oil was 68:22:7:4.5.

(3) The Preparation of the Spinning Solution of Ultra-High Molecular Weight Polyethylene The swollen solution prepared in step (1) was stirred in swelling kettle under room temperature, then the swollen solution was heated to 90° C. and the dissolved solution prepared in step (2) was added, after stirring for 70 min, the spinning solution of ultra-high molecular weight polyethylene fiber was obtained, in which the weight ratio of the swollen solution to the dissolved solution was 1:1.8, and the content of the ultra-high molecular weight polyethylene in the spinning solution obtained was 10.5 wt %.

Comparative Example 1

7 weight parts of ultra-high molecular weight polyethylene and 93 weight parts of white oil were stirred in a first swelling kettle under 65° C. for 24 hours, then transferred to a second swelling kettle and stirred under 75° C. for 12 hours, then transferred to a third swelling kettle and stirred under 110° C. for 12 hours (the stirring speeds in the above three swelling kettles were all 5 rpm), then enforcedly cooled to 70° C., and a spinning solution with a solid content of 7% was obtained.

Comparative Example 2

A swollen solution with a content of the ultra-high molecular weight polyethylene being 8% was prepared according to the preparation process for the swollen solution in Example 1 to be used as a spinning solution.

Comparative Example 3

A swollen solution with a content of the ultra-high molecular weight polyethylene being 10% was prepared according to the preparation process for the swollen solution in Example 2 to be used as a spinning solution.

Spinning Experiment 1

The spinning solutions prepared in examples 1-9 and comparative examples 1-3 were spinned according to the same process to prepare ultra-high molecular weight polyethylene fiber, and the specific spinning process was as follows:

The spinning solution was fed into a twin screw extruder for macromolecular disentanglement, here, the inlet temperature of the extruder was 100° C., the temperature in the middle region is 260° C., and the outlet temperature is 290° C. The residence time in the twin screw extruder was 5 min, and the rotation speed of the extruder was 190 r/min. After the disentanglement and extrusion of the suspension by the twin screw extruder, a transparent gel solution was formed. The gel solution was passed through a metering pump and extruded at a spinning speed of 1 m/min through a spinneret plate having 400 orifices (spinneret orifice diameter 1 mm, length-diameter ratio L/D 10/1) into a water channel at a temperature of 25° C., then the filament solidified and gel filament formed. The gel filament thus obtained was extracted by kerosene and then passed through two-stage drying at 55° C. and 60° C., respectively. The dried gel filament was applied a three-stage thermal drawing as defined below in detail: the first stage drawing was conducted under 100° C. and the drawing ratio was 2.5 times; the second stage drawing was conducted under 120° C. and the drawing ratio was 3.8 times; the third stage drawing was conducted under 130° C. and the drawing ratio was 4.4 times. After this three-stage drawing of the gel filament, ultra-high molecular weight polyethylene fiber was obtained.

Samples were taken to conduct mechanical behavior test. Ten samples were taken each time and average value was reported. The results are shown in table 1 below.

TABLE 1

The performance test results of the ultra-high molecular weight polyethylene fibers prepared in spinning experiment 1

|  | Strength (cN/dtex) | Strength CV value (%) | Modulus (cN/dtex) |
| --- | --- | --- | --- |
| Example 1 | 31.2 | 2.8 | 1277 |
| Example 2 | 32.1 | 2.7 | 1282 |
| Example 3 | 31.6 | 3.1 | 1282 |
| Example 4 | 34.3 | 2.4 | 1335 |
| Example 5 | 32.5 | 2.5 | 1305 |
| Example 6 | 32.1 | 2.8 | 1295 |
| Example 7 | 32.7 | 3.1 | 1312 |
| Example 8 | 33.6 | 2.8 | 1320 |
| Example 9 | 33.2 | 3.1 | 1332 |
| Comparative example 1 | 28.6 | 5.2 | 810 |
| Comparative example 2 | 28.3 | 4.9 | 795 |
| Comparative example 3 | 28.4 | 4.8 | 786 |

As can be seen from table 1, the ultra-high molecular weight polyethylene fibers prepared under the same spinning conditions from the spinning solutions prepared According to the present invention show low CV values and have high fiber consistency.

Spinning Experiment 2

The spinning solutions prepared in examples 1-9 and comparative examples 1-3 were spinned according to the same process to prepare ultra-high molecular weight polyethylene fiber, and the specific spinning process was as follows:

The spinning solution was fed into a twin screw extruder for macromolecular disentanglement, here, the inlet temperature of the extruder was 95° C., the temperature in the middle region is 270° C., and the outlet temperature is 295° C. The residence time in the twin screw extruder was 6 min, and the rotation speed of the extruder was 175 r/min. After the disentanglement and extrusion of the suspension by the twin screw extruder, a transparent gel solution was formed. The gel solution was passed through a metering pump and extruded at a spinning speed of 1.1 m/min through a spinneret plate having 400 orifices (spinneret orifice diameter 1 mm, length-diameter ratio L/D 10/1) into a water channel at a temperature of 25° C., then the filament solidified and gel filament formed. The gel filament thus obtained was extracted by kerosene and then passed through two-stage drying at 54° C. and 61° C., respectively. The dried gel filament was given a three-stage thermal drawing as defined below in detail: the first stage drawing was conducted under 100° C. and the drawing ratio was 2.9 times; the second stage drawing was conducted under 120° C. and the drawing ratio was 4.4 times; the third stage drawing was conducted under 128° C. and the drawing ratio was 3.1 times. After this three-stage drawing of the gel filament, ultra-high molecular weight polyethylene fiber was obtained.

Samples were taken to conduct mechanical behavior test. Ten samples were taken each time and average value was reported. The results are shown in table 2 below.

TABLE 2

The performance test results of the ultra-high molecular weight polyethylene fibers prepared in spinning experiment 2

|  | Strength (cN/dtex) | Strength CV value (%) | Modulus (cN/dtex) |
| --- | --- | --- | --- |
| Example 1 | 31.5 | 2.9 | 1268 |
| Example 2 | 32.5 | 2.9 | 1279 |
| Example 3 | 30.9 | 2.9 | 1295 |
| Example 4 | 33.9 | 2.8 | 1328 |
| Example 5 | 33.1 | 2.6 | 1310 |
| Example 6 | 31.8 | 2.7 | 1289 |
| Example 7 | 31.7 | 3.2 | 1323 |
| Example 8 | 32.6 | 3.6 | 1315 |
| Example 9 | 32.2 | 2.9 | 1318 |
| Comparative example 1 | 28.4 | 5.3 | 795 |
| Comparative example 2 | 28.4 | 4.5 | 816 |
| Comparative example 3 | 28.1 | 4.5 | 775 |

As can be seen from table 2, the ultra-high molecular weight polyethylene fibers prepared under the same spinning conditions from the spinning solutions prepared According to the present invention show low CV values and have high fiber consistency.

Detailed description has been made above on the ultra-high molecular weight polyethylene fiber spinning solution provided by the present invention. Specific examples are provided for illustrating the principle and embodiments of the present invention, however, these examples are provided for the purpose of better understanding the methods of the invention and the basic concepts thereof. It is should be noted that, some improvements and modifications can be made to the present invention without departing from the principle of the invention, which are intended to fall within the scope defined by the claims of the present invention.

What is claimed is:

1. A method for preparing a spinning solution of ultra-high molecular weight polyethylene fiber, comprising:
   mixing a dissolved solution of ultra-high molecular weight polyethylene with a swollen solution of ultra-high molecular weight polyethylene at a weight ratio of 0.42 to 2.85, to obtain a spinning solution in which the content of the ultra-high molecular weight polyethylene is 10% to 15% by weight;
   wherein the swollen solution of ultra-high molecular weight polyethylene has a degree of swelling of 1 to 2;
   wherein the content of the ultra-high molecular weight polyethylene in the swollen solution of ultra-high molecular weight polyethylene is 10 to 50% by weight; and
   wherein the weight ratio of the ultra-high molecular weight polyethylene in the swollen solution of ultra-high molecular weight polyethylene to the ultra-high molecular weight polyethylene in the dissolved solution of ultra-high molecular weight polyethylene is 2.5 to 70;
   wherein the swollen solution of ultra-high molecular weight polyethylene is prepared by:
   adding a powder of ultra-high molecular weight polyethylene to a first portion of a solvent under stirring;
   adding a second portion of the solvent and a first emulsified solvent to the first portion of the solvent to obtain a first mixture; and
   heating the first mixture to 90° C. to 130° C. and holding at a temperature for swelling to obtain the swollen solution of ultra-high molecular weight polyethylene;
   wherein the first emulsified solvent is formed from a third portion of the solvent, an antioxidant and a surfactant through emulsification; and
   wherein the weight ratio of the first portion of the solvent: the second portion of the solvent:the third portion of the solvent:the antioxidant:the surfactant is 45 to 55:45 to 55:1 to 20:0.5 to 5:0.05 to 0.1; and wherein the dissolved solution of ultra-high molecular weight polyethylene is prepared by:

adding a second emulsified solvent, a fourth emulsified solvent and a fifth portion of solvent to a fourth portion of the solvent under well stirring to obtain a second mixture, and then heating the second mixture to 100° C. to 190° C. under stirring to obtain the dissolved solution of ultra-high molecular weight polyethylene;

wherein the second emulsified solvent is formed from a sixth portion of the solvent and the ultra-high molecular weight polyethylene in a proportion of 1 to 5:0.4 to 0.6 through emulsification;

wherein the fourth emulsified solvent is formed from a seventh portion of the solvent and an antioxidant through emulsification; and wherein the weight ratio of the fourth portion of the solvent:the fifth portion of the solvent:the sixth portion of the solvent:the seventh portion of the solvent is 67 to 75:15 to 25:2 to 10:2 to 4.

2. The method of claim 1, wherein the weight ratio of the dissolved solution of ultra-high molecular weight polyethylene to the swollen solution of ultra-high molecular weight polyethylene is 1.0 to 2.5.

3. The method of claim 2, wherein the content of the ultra-high molecular weight polyethylene in the swollen solution of ultra-high molecular weight polyethylene is 20 to 30% by weight.

4. The method of claim 3, wherein the weight ratio of the ultra-high molecular weight polyethylene in the swollen solution of ultra-high molecular weight polyethylene to the ultra-high molecular weight polyethylene in the dissolved solution of ultra-high molecular weight polyethylene is 10 to 30.

5. The method of claim 4, wherein the content of the ultra-high molecular weight polyethylene in the spinning solution of ultra-high molecular weight polyethylene fiber is 11% to 14% by weight.

6. The method of claim 5, wherein the content of the ultra-high molecular weight polyethylene in the spinning solution of ultra-high molecular weight polyethylene fiber is 12% to 13% by weight.

7. The method of claim 1, wherein a weight average molecular weight of the ultra-high molecular weight polyethylene in the spinning solution of ultra-high molecular weight polyethylene fiber is $3\times10^6$ to $5\times10^6$.

8. The method of claim 7, wherein a solvent in the spinning solution of ultra-high molecular weight polyethylene fiber is a mixed solvent obtained by mixing cyclane and alkane in a proportion of 85~90:10 to 15, and wherein the cyclane has 25 to 50 carbon atoms and the alkane has 25 to 50 carbon atoms.

* * * * *